(12) United States Patent
Lin et al.

(10) Patent No.: US 11,745,315 B2
(45) Date of Patent: Sep. 5, 2023

(54) VACUUM CLAMPING NOZZLE

(71) Applicant: Delta Electronics, Inc., Taoyuan (TW)

(72) Inventors: Chun-Tsun Lin, Taoyuan (TW);
Sheng-Tzu Wang, Taoyuan (TW);
Yuan-Kun Hsiao, Taoyuan (TW);
Jian-Jang Lai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 94 days.

(21) Appl. No.: 17/463,761

(22) Filed: Sep. 1, 2021

(65) Prior Publication Data
US 2022/0234174 A1    Jul. 28, 2022

(30) Foreign Application Priority Data
Jan. 22, 2021    (CN) .......................... 202110086728.0

(51) Int. Cl.
*B25B 11/00* (2006.01)
*B23Q 3/00* (2006.01)

(52) U.S. Cl.
CPC .............. *B25B 11/005* (2013.01); *B23Q 3/00* (2013.01); *B23Q 2703/04* (2013.01); *B23Q 2703/10* (2013.01)

(58) Field of Classification Search
CPC ..... B25B 11/005; B25B 11/007; B25B 23/10; B25B 23/103; B25B 23/105; B25B 23/106; B23Q 2703/04; B23Q 3/00; B23P 19/005; B23P 19/006; B23B 31/20; B23B 31/201; B23B 31/204; B23B 31/206; B23B 31/207; B23B 31/265; B23B 31/2072
USPC ....... 269/20, 21; 81/451, 452, 453, 457, 458
See application file for complete search history.

(56) References Cited

U.S. PATENT DOCUMENTS

| 3,834,118 | A | * | 9/1974 | Waldrop | .................. B65B 31/06 53/512 |
| 6,418,818 | B1 | * | 7/2002 | Tham | ...................... B25B 23/10 81/54 |
| 2016/0236334 | A1 | * | 8/2016 | Eigner | .................. B25B 21/002 |
| 2022/0143791 | A1 | * | 5/2022 | Monjardin | .......... B25B 23/0071 |

\* cited by examiner

*Primary Examiner* — Lee D Wilson
*Assistant Examiner* — Alberto Saenz
(74) *Attorney, Agent, or Firm* — Muncy, Geissler, Olds & Lowe, P.C.

(57) ABSTRACT

A vacuum suction nozzle is provided, including a first housing, a second housing, an accommodating space, a gap, and a clamping assembly. The first housing includes a first lateral wall, a first lower surface, a channel, and a through hole. The through hole is formed on the first lateral wall. The second housing is fixedly connected to the first housing, and includes a second lateral wall and a second lower surface. The accommodating space is formed between the first lateral wall and the second lateral wall, and the through hole is opened onto the channel and the accommodating space. The gap is formed between the first lower surface and the second lower surface, and is opened onto the accommodating space. The clamping assembly is disposed in the accommodating space.

15 Claims, 8 Drawing Sheets

VACUUM CLAMPING NOZZLE

CROSS REFERENCE TO RELATED APPLICATIONS

This application claims the benefit of China Patent Application No. 202110086728.0, filed Jan. 22, 2021, the entirety of which is incorporated by reference herein.

BACKGROUND OF THE INVENTION

Field of the Invention

The application relates in general to a vacuum clamping nozzle, and in particular, to a vacuum clamping nozzle used to apply suction to a locking member.

Description of the Related Art

Figure 1:
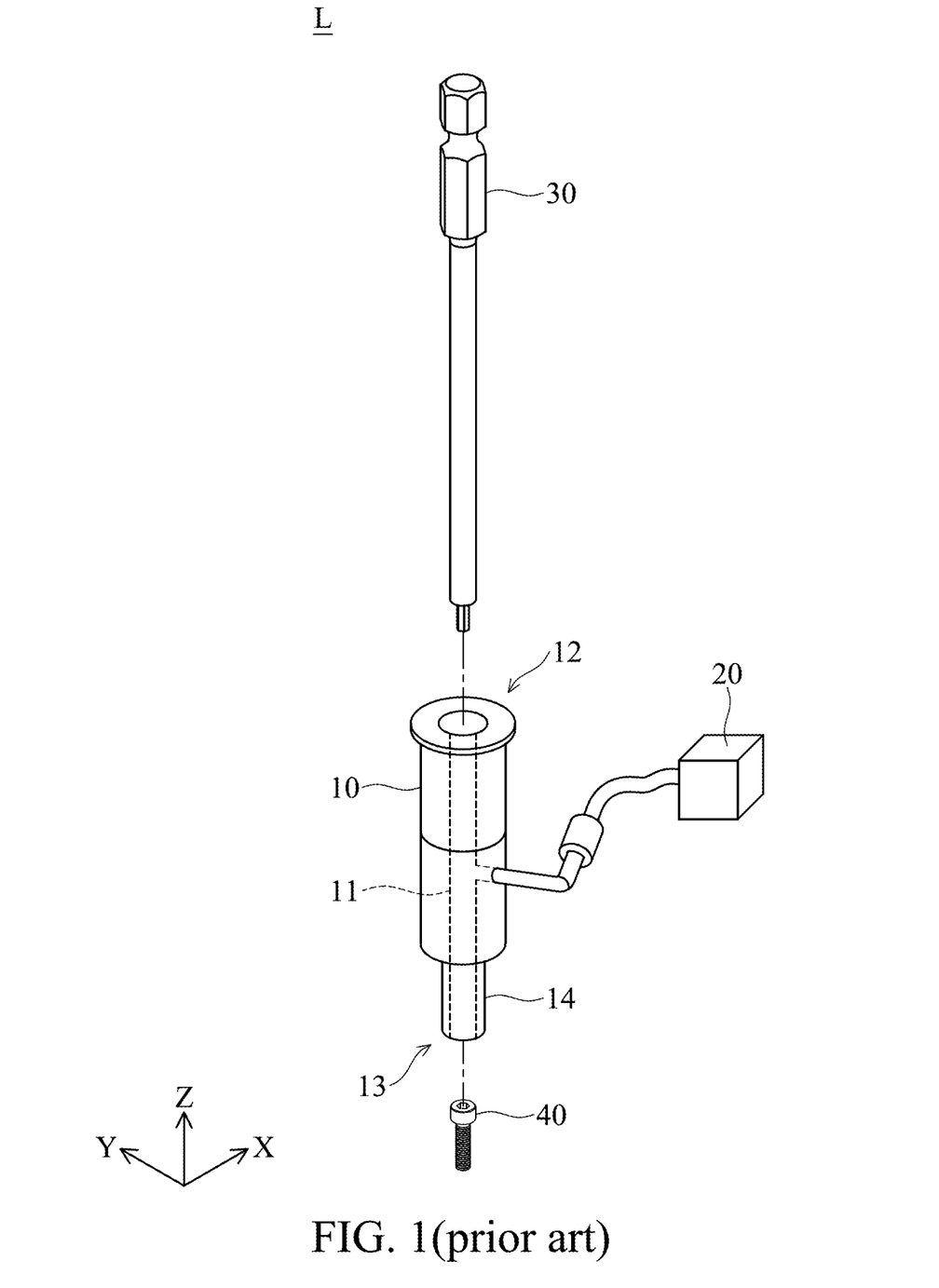
FIG. 1 is a schematic diagram of a conventional locking device.

FIG. 1 is a conventional locking device L, including a sucking mechanism 10, a vacuum generator 20, and a locking means 30. The sucking mechanism 10 includes a channel 11 extending from the upper end 12 of the sucking mechanism 10 to its lower end 13. The vacuum generator 20 passes through the case of the sucking mechanism 10, so as to communicate with the channel 11. The locking means 30 can enter the channel 11 from the upper end 12 of the sucking mechanism 10. For example, the locking means 30 can be a screwdriver, an automatic screwing machine, or a riveting machine.

When the user desires to use the locking device L, the vacuum generator 20 can operate and exhaust the gas from the channel 11, and a locking member 40 (such as a screw or a rivet) can be mounted to a vacuum clamping nozzle 14, which is disposed on the lower end 11 of the sucking mechanism 11. However, the suction force may be reduced due to an unstable vacuum source or the tolerance of the screw member. Moreover, when the screwing machine moves or suctions the screw at high speed, the suctioned screw may move into an incorrect position, or the screw may fall. This may cause the locking screw to fail or the workpiece surface to be damaged due to collision. Therefore, how to address the aforementioned problem has become an important issue.

BRIEF SUMMARY OF INVENTION

A vacuum clamping nozzle is provided. The vacuum clamping nozzle is connected to a vacuum generator and configured to apply suction to a locking member. The vacuum clamping nozzle includes a first housing, a second housing, an accommodating space, a gap, and a clamping assembly. The first housing includes a first lateral wall, a first lower surface, a channel, a through hole, and a first opening. The first lateral wall is connected to the first lower surface, and surrounds the channel. The through hole and the first opening are respectively formed on the first lateral wall and the first lower surface, and are opened onto each other. The second housing is fixedly connected to the first housing, and includes a second lateral wall, a second lower surface, and a second opening. The second lateral wall is connected to the second lower surface, and surrounds the first lateral wall. The second opening is formed on the second lower surface, and corresponds to the first opening. The accommodating space is formed between the first lateral wall and the second lateral wall, and the through hole is opened onto the channel and the accommodating space. The gap is formed between the first lower surface and the second lower surface, and opened onto the first opening and the second opening. The accommodating space is opened onto the gap. The clamping assembly is disposed in the accommodating space. When the vacuum generator exhausts the gas in the channel, and the locking member covers the first opening, the clamping assembly moves relative to the first housing, and is in contact with the locking member via the gap.

A vacuum clamping nozzle is also provided. The vacuum clamping nozzle is connected to a vacuum generator and configured to apply suction to a locking member. The vacuum clamping nozzle includes a first housing, a second housing, an accommodating space, a movable member, and a contact member. The first housing includes a first lateral wall, a channel, a through hole, and a first opening. The first lateral wall surrounds the channel. The through hole is formed on the first lateral wall, and the first opening is opened onto the channel. The second housing is fixedly connected to the first housing, and includes a second lateral wall, a second lower surface, and a second opening. The second lateral wall surrounds the first lateral wall, and the second opening corresponds to the first opening. The accommodating space is formed between the first lateral wall and the second lateral wall. The through hole is opened onto the channel and the accommodating space. The movable member is disposed in the accommodating space, and the contact member is connected to the first housing. When the vacuum generator exhausts the gas in the channel, and the locking member covers the first opening, the movable member moves relative to the first housing and pushes the contact member, and the contact member is in contact with the locking member.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the vacuum clamping nozzle are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The following disclosure provides many different embodiments, or examples, for implementing different features of the subject matter provided. Specific examples of solutions and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
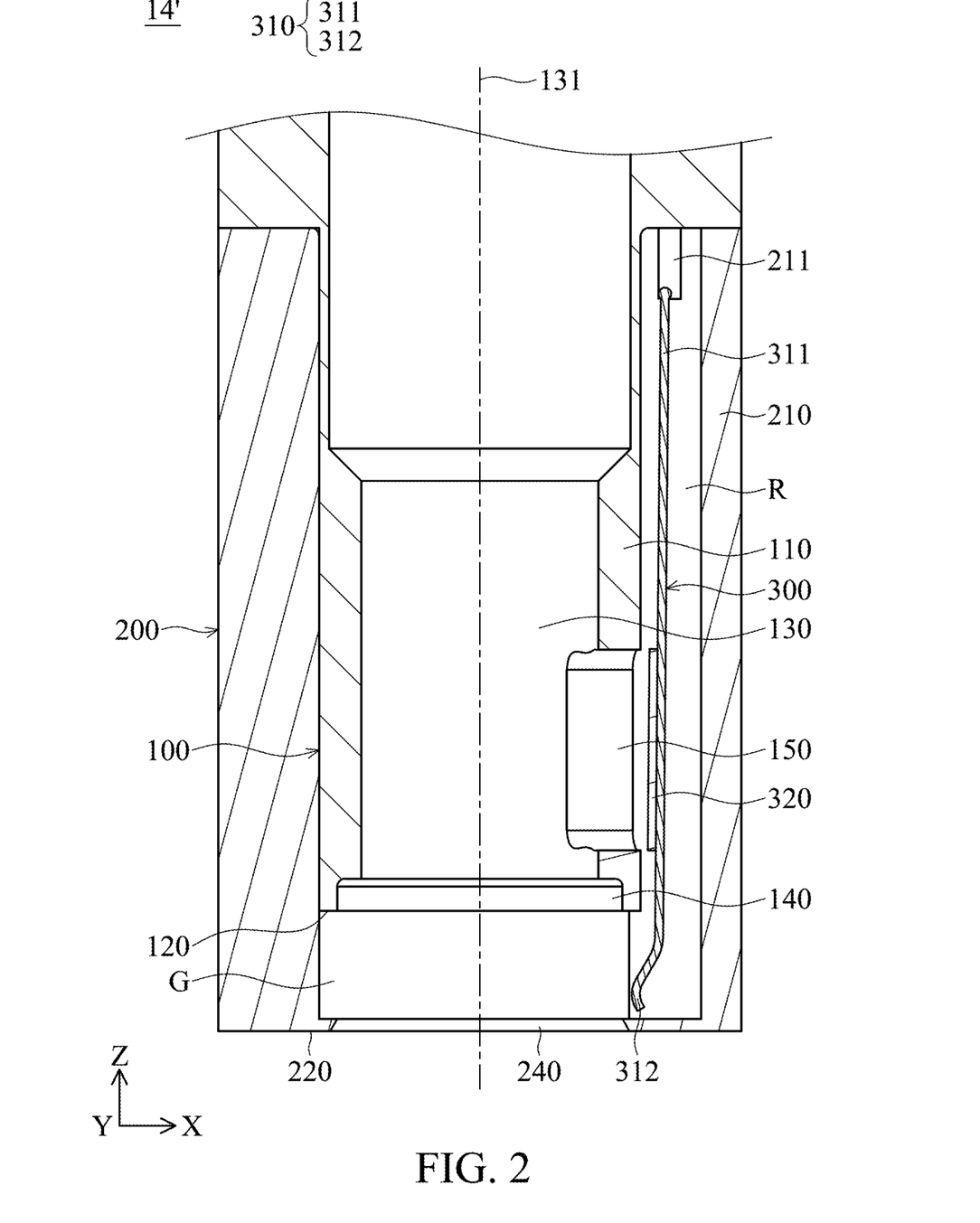
FIG. 2 is a schematic diagram of a vacuum clamping nozzle according to an embodiment of the invention.

FIG. 2 is a cross-sectional view of a vacuum clamping nozzle 14'. The vacuum clamping nozzle 14' can be used to replace the vacuum clamping nozzle 14 in FIG. 1. As shown in FIG. 2, in this embodiment, the vacuum clamping nozzle 14' includes a first housing 100, a second housing 200, and a clamping assembly 300.

The first housing 100 includes a first lateral wall 110, a first lower surface 120, a channel 130, a first opening 140, and a through hole 150. The first lateral wall 110 is connected to the first lower surface 120, and surrounds the channel 130. It should be noted that, the channel 130 forms a part of the channel 11 of the sucking mechanism 10, so that the vacuum generator 20 can directly exhaust the gas in the channel 130. The first opening 140 is formed on the first lower surface 120, and is communicated with the channel 130. The through hole 150 is formed on the first lateral wall 110, and is communicated with the channel 130 too.

The second housing 200 is detachably affixed to the first housing 100, and includes a second lateral wall 210, a second lower surface 220, and a second opening 240. The second lateral wall 210 is connected to the second lower surface 220, and the second opening 240 is formed on the second lower surface 220. The position of the second opening 240 corresponds to the position of the first opening 140. In XY-plane, the dimensions (the cross-sectional area) of the second opening 240 are greater than or the same as the dimensions (the cross-sectional area) of the first opening 140. In other words, as seen from the central axis 131 of the channel 130, the first opening 140 is disposed inside the outline of the second opening 240. In this embodiment, the dimensions of the second opening 240 are substantially the same as the dimensions of the first opening 140, and the second opening 240 has a chamfer.

At least a portion of the second lateral wall 210 is separated from the first lateral wall 110, so that an accommodating space R is formed between the first lateral wall 110 and the second lateral wall 210. Similarly, the second lower surface 220 is separated from the first lower surface 120, so that a gap G is formed between the first lower surface 120 and the second lower surface 220. In this embodiment, the gap G is communicated with the first opening 140, the second opening 240, and the accommodating space R, and the through hole 150 is communicated with the channel 130 and the accommodating space R.

Figure 3:
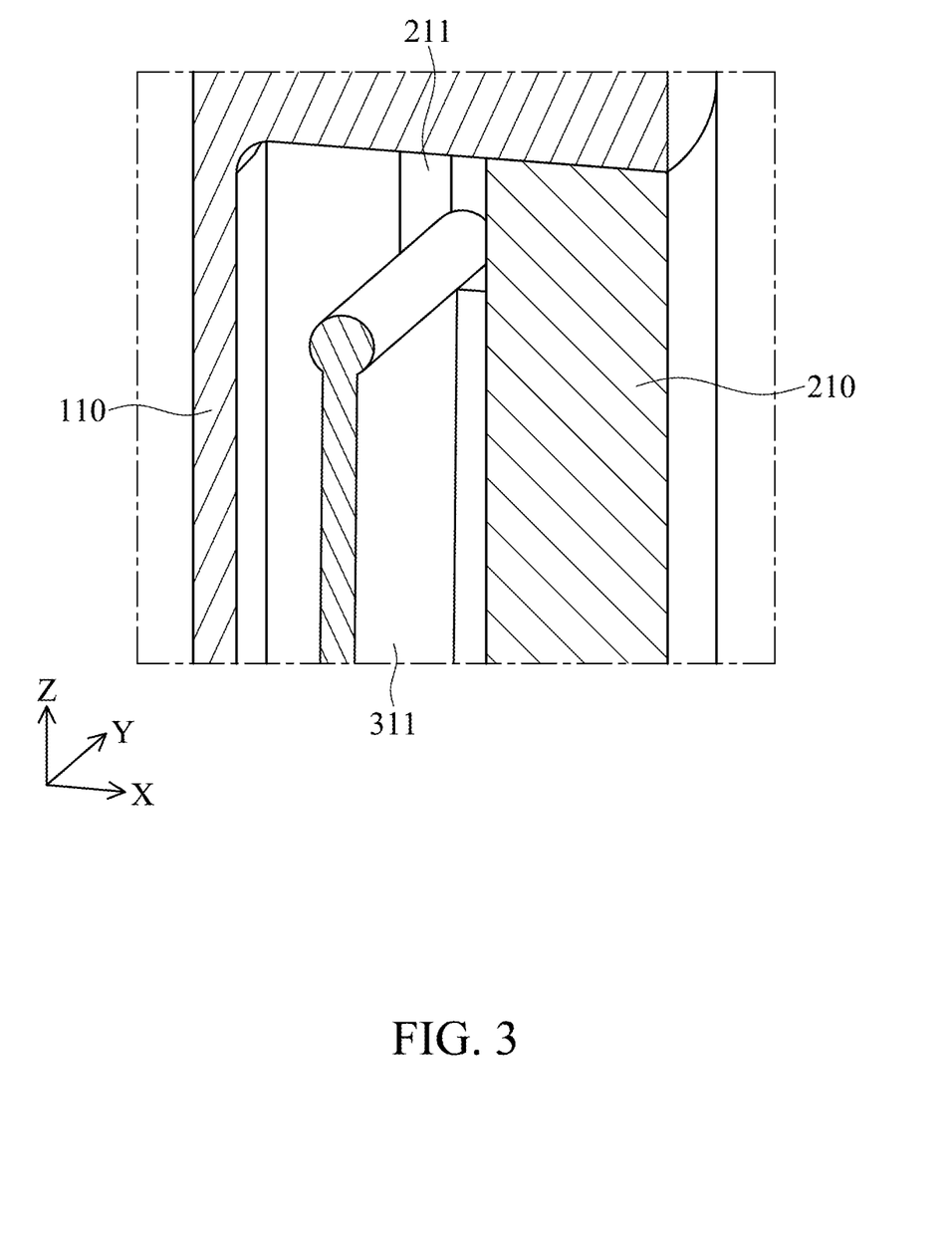
FIG. 3 is a partial cross-sectional view of the vacuum clamping nozzle according to an embodiment of the invention.

The clamping assembly 300 is disposed in the accommodating space R, and includes a rotatable member 310 and a sealing member 320. The rotatable member 310 can be a longitudinal structure having metal. An end of the rotatable member 310 is rotatably connected to the second housing 200, and the other end of the rotatable member 310 is hang in the accommodating space R and adjacent to the gap G. In detail, the rotatable member 310 can be divided into a pivot portion 311 and a clamping portion 312. An end of the clamping portion 311 is rotatably connected to the second housing 200, and the other end of the clamping portion 311 is connected to the clamping portion 312. The clamping portion 312 protrudes from the pivot portion 311 toward the gap G. As shown in FIG. 3, in this embodiment, the end of the pivot portion 311 connected to the second housing 200 is hang in a recess 211. The recess 211 is formed on the inner surface of the second lateral wall 210, and the dimensions of the recess 210 are greater than the thickness of the pivot portion 311. Therefore, in this embodiment, the clamping assembly 300 can also move relative to the first housing 100.

The sealing member 320 is disposed on the rotatable member 310, and its position corresponds to the through hole 150 on the first lateral wall 110. In this embodiment, the sealing member 320 includes soft material, such as rubber. In some embodiments, the sealing member 320 can include metal material.

As shown in FIG. 2, when the user does not use the locking device L to apply suction to the locking member 400, the clamping assembly 300 is in a predetermined position, and the clamping assembly 300 is spaced away from the through hole by a distance.

Figure 4:
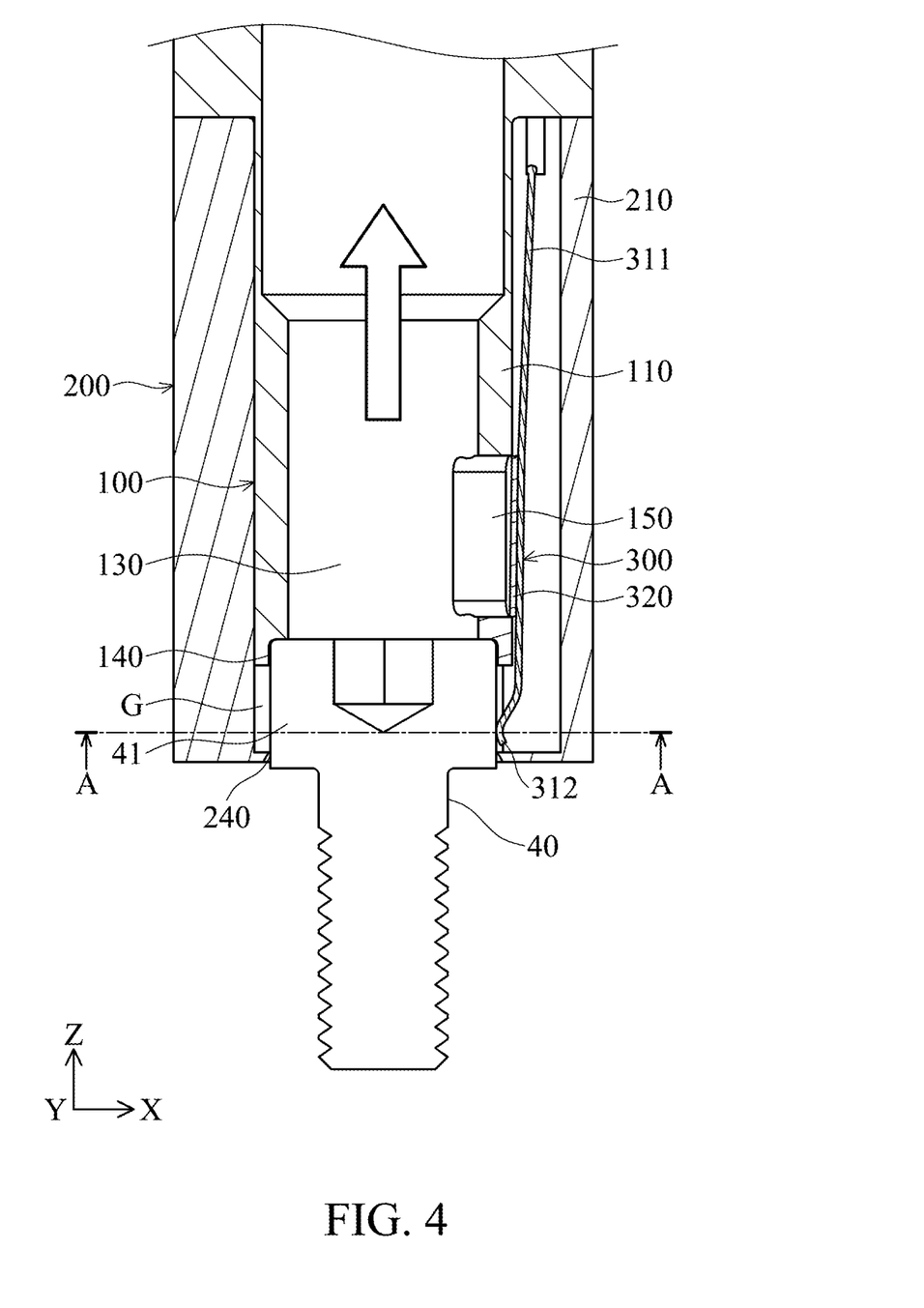
FIG. 4 is a schematic diagram that represents that a locking member is mounted on the vacuum clamping nozzle and a vacuum generator exhausts the gas in the channel according to an embodiment of the invention.

As shown in FIG. 4, when the user uses the locking device L to apply suction to the locking member 40, the locking member 40 can pass the second opening 240, the gap G, and the first opening 140 in sequence and then be mounted on the vacuum clamping nozzle 14'. The vacuum generator 20 can exhaust the gas from the channel 130. Since the dimensions (the cross-sectional area) of the first opening 140 in XY-plane are substantially the same as the dimensions of the locking portion 41 of the locking member 40, and the dimensions (the cross-sectional area) of the channel 130 in XY-plane is less than the dimensions of the first opening 140, the locking member 40 can cover the first opening 140, and can be affixed by the suction force of the vacuum generator 20. Moreover, since the through hole 150 is formed on the first lateral wall 110, the vacuum generator 20 can provide suction force to the clamping assembly 300, and the clamping assembly 300 can rotate and/or move relative to the first housing 100. Thereby, the clamping portion 312 of the clamping assembly 300 can be in contact with the locking portion 41 of the locking member 40 to provide a further clamping force to the locking member 40.

It should be noted that, when the clamping assembly 300 rotates and/or moves relative to the first housing 100 due to the attraction of the suction force, the sealing member 320 enters the through hole 150 and entirely seals the through hole 150. Therefore, when the locking member 40 is suctioned, the whole suction force of the vacuum generator 20 can be applied on the locking member 40. The suction force will not be reduced due to the through hole 150.

Figure 5:
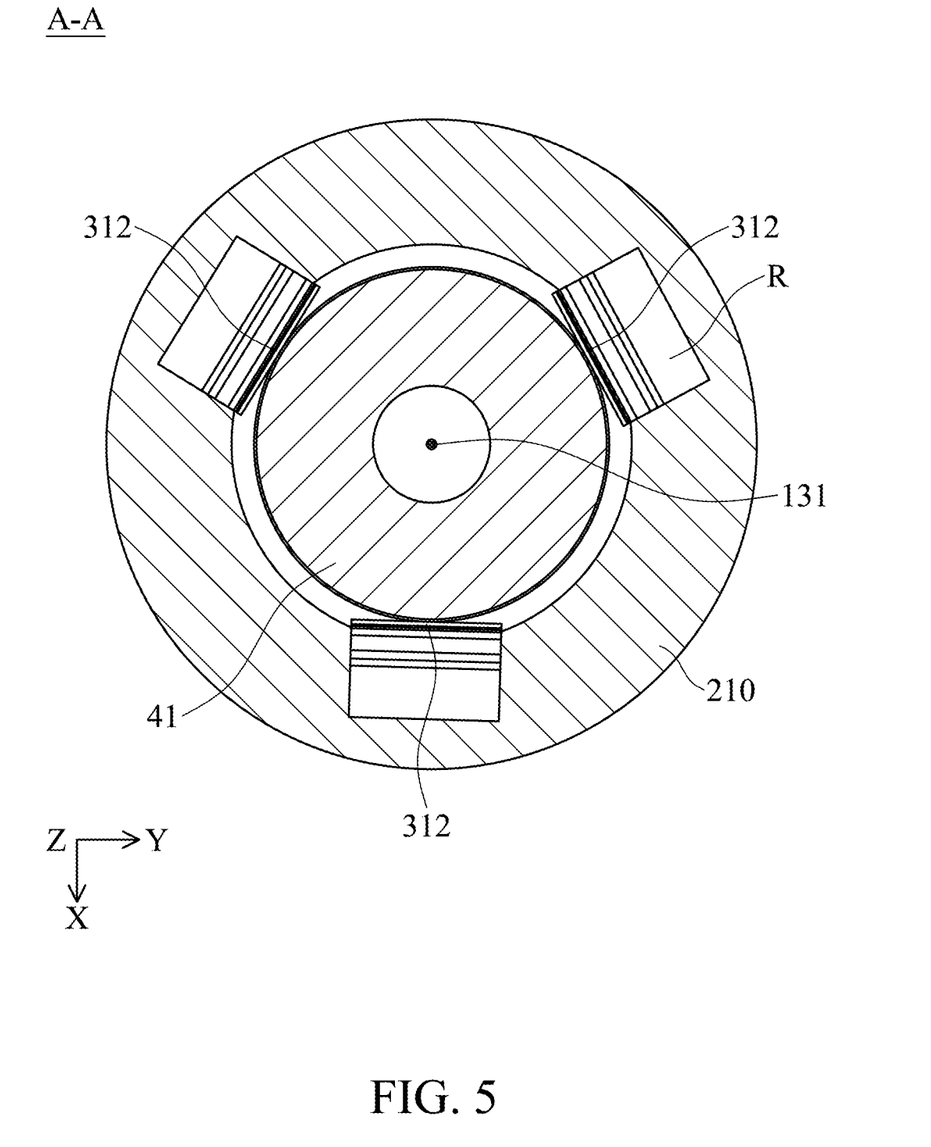
FIG. 5 is a cross-sectional view of the vacuum clamping nozzle according to an embodiment of the invention.

Referring to FIG. 5, in another embodiment of the invention, the vacuum clamping nozzle 14' further includes a plurality of clamping assemblies 300. A plurality of through holes 150 corresponding to the clamping assemblies 300 are formed on the first lateral wall 110 of the first housing 100, and the clamping assemblies 300 are arranged in a rotational symmetric manner relative to the central axis 131 of the channel 130.

Figure 6:
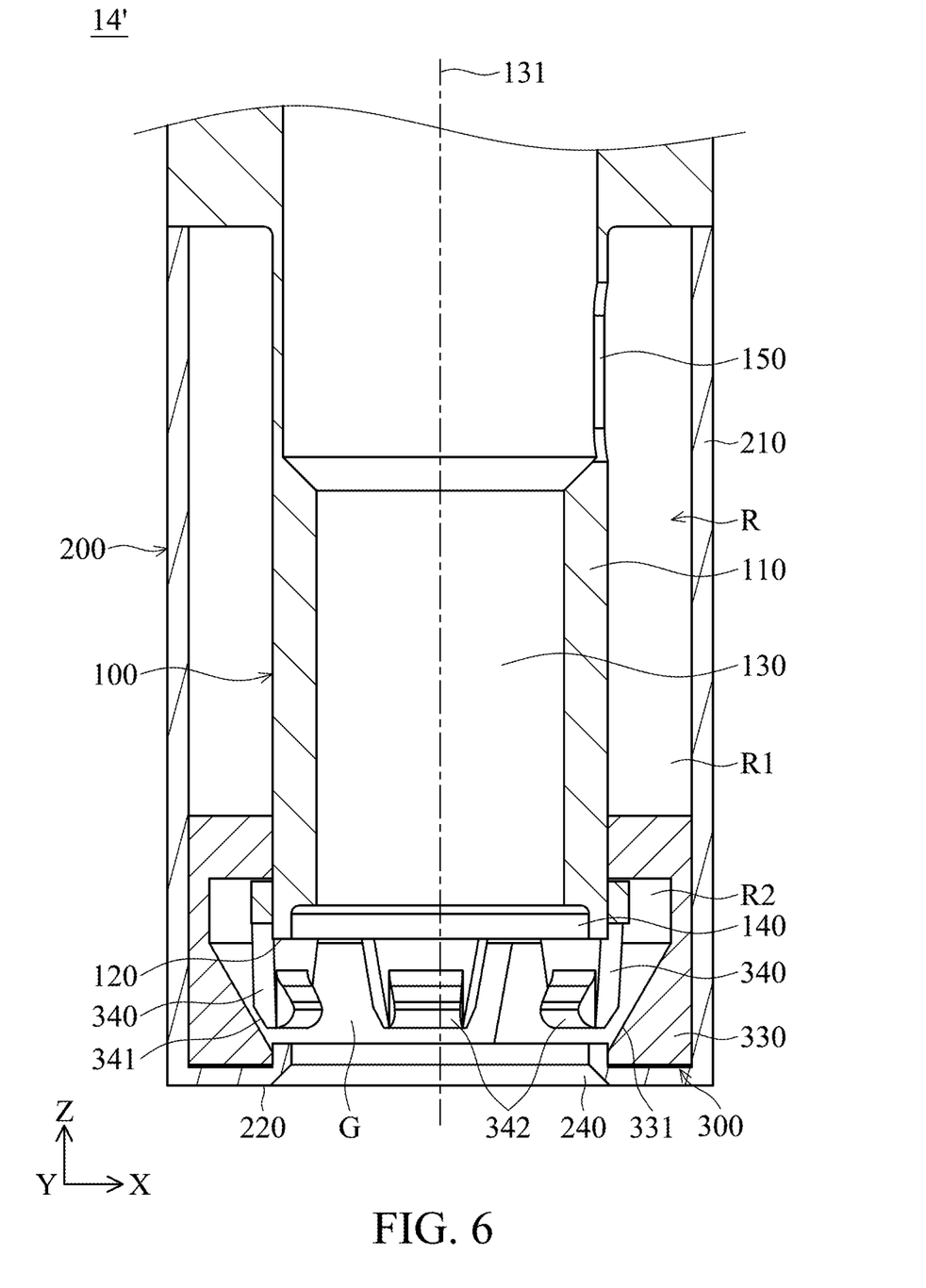
FIG. 6 is a partial cross-sectional view of a vacuum clamping nozzle according to another embodiment of the invention.

FIG. 6 is a cross-sectional view of a vacuum clamping nozzle 14' according to another embodiment of the invention. As shown in FIG. 6, in this embodiment, the clamping assembly 300 includes a movable member 330 and at least one contact member 340. The movable member 330 is disposed in the accommodating space R and surrounds the first housing 100, and is slidable relative to the first housing 100 along the central axis 131 of the channel 130. Furthermore, the movable member 330 has an inclined surface 331 facing the contact member 340.

It should be noted that, the cross-section of at least a portion of the movable member 330 in XY-plane is substantially the same as the cross-section of the accommodating space R in XY-plane, so that the accommodating space R can be divided into an upper region R1 and a lower region R2 when the movable member 330 disposed in the accommodating space R. The upper region R1 is communicated with the channel 130 via the through hole 150. The contact member 340 is disposed in the lower region R2.

The contact member 340 is affixed to the first housing 100, and is flexible. The contact member 340 has an inclined surface 341 and a protruding portion 342, wherein the inclined surface 341 faces the inclined surface 331 of the movable member 330, and the protruding portion 342 protrudes toward the gap G. In this embodiment, the slope of the inclined surface 341 of the contact member 340 is substantially the same as the slope of the inclined surface 331 of the movable member 330. The contact member 341 and the first housing 100 can be integrally formed in one piece.

Figure 7:
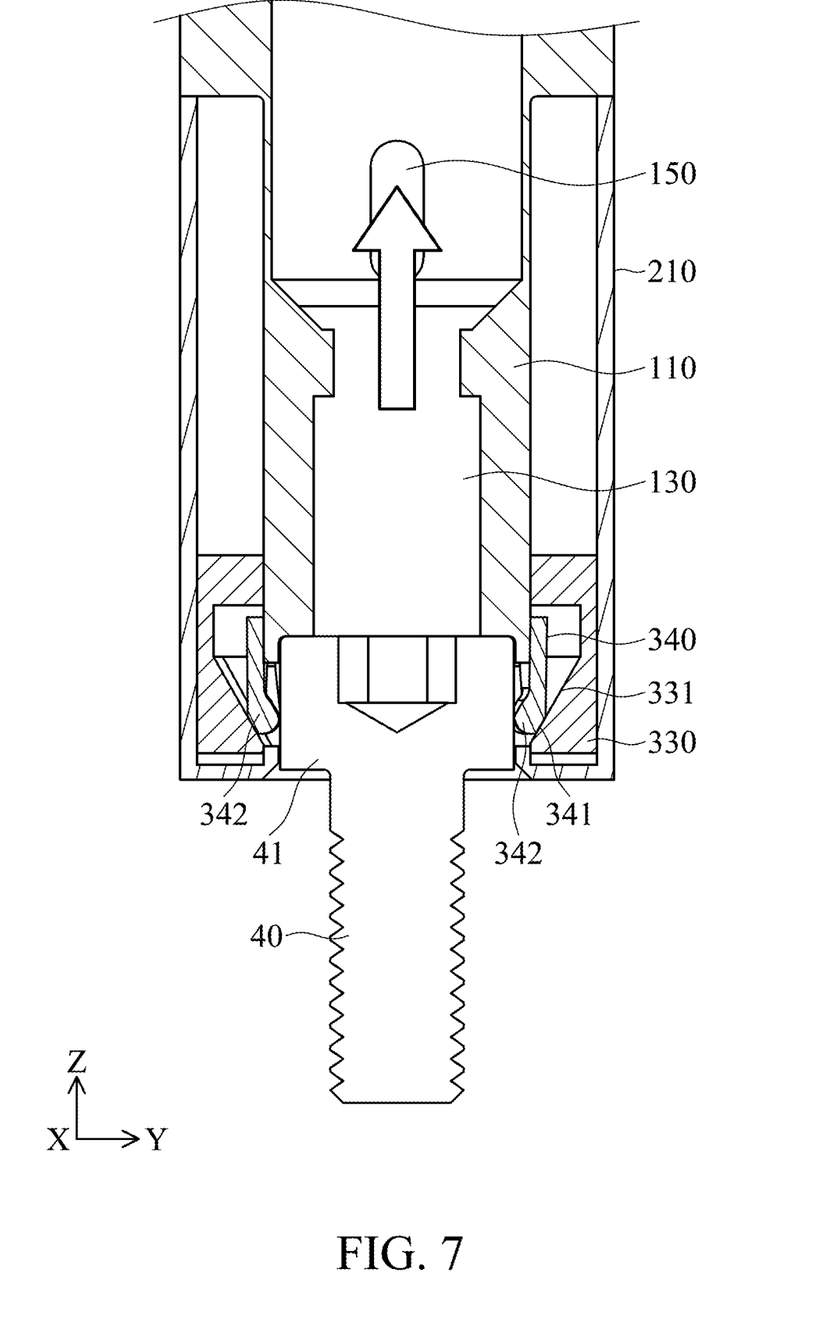
FIG. 7 is a schematic diagram that represents that a locking member is mounted on the vacuum clamping nozzle and a vacuum generator exhausts the gas in the channel according to another embodiment of the invention.

As shown in FIG. 7, when the user uses the locking device L to apply suction to the locking member 40, the locking member 40 can pass the second opening 240, the gap G, and the first opening 140 in sequence and then be mounted on the vacuum clamping nozzle 14'. The vacuum generator 20 can exhaust the gas from the channel 130. Since the dimensions (the cross-sectional area) of the first opening 140 in XY-plane are substantially the same as the dimensions of the locking portion 41 of the locking member 40, and the dimensions (the cross-sectional area) of the channel 130 in XY-plane is less than the dimensions of the first opening 140, the locking member 40 can cover the first opening 140, and can be affixed by the suction force of the vacuum generator 20.

Furthermore, the vacuum generator 20 can generate the suction force in the upper region R1 via the through hole 150, and the movable member 330 of the clamping assembly 300 therefore slides upwardly along the central axis 131 of the channel 130.

When the movable member 330 slides upwardly, its inclined surface 331 is in contact with the inclined surface 341 of the contact member 340 and pushes the contact member 340. The contact member 340 is then deformed. Therefore, the protruding portion 342 of the contact member 340 can be in contact with the locking portion 41 of the locking member 40 to provide a further clamping force to the locking member 40. In this embodiment, both the movable member 330 and the contact member 340 include metal material, so as to reduce the debris created by the contact between the members.

Figure 8:
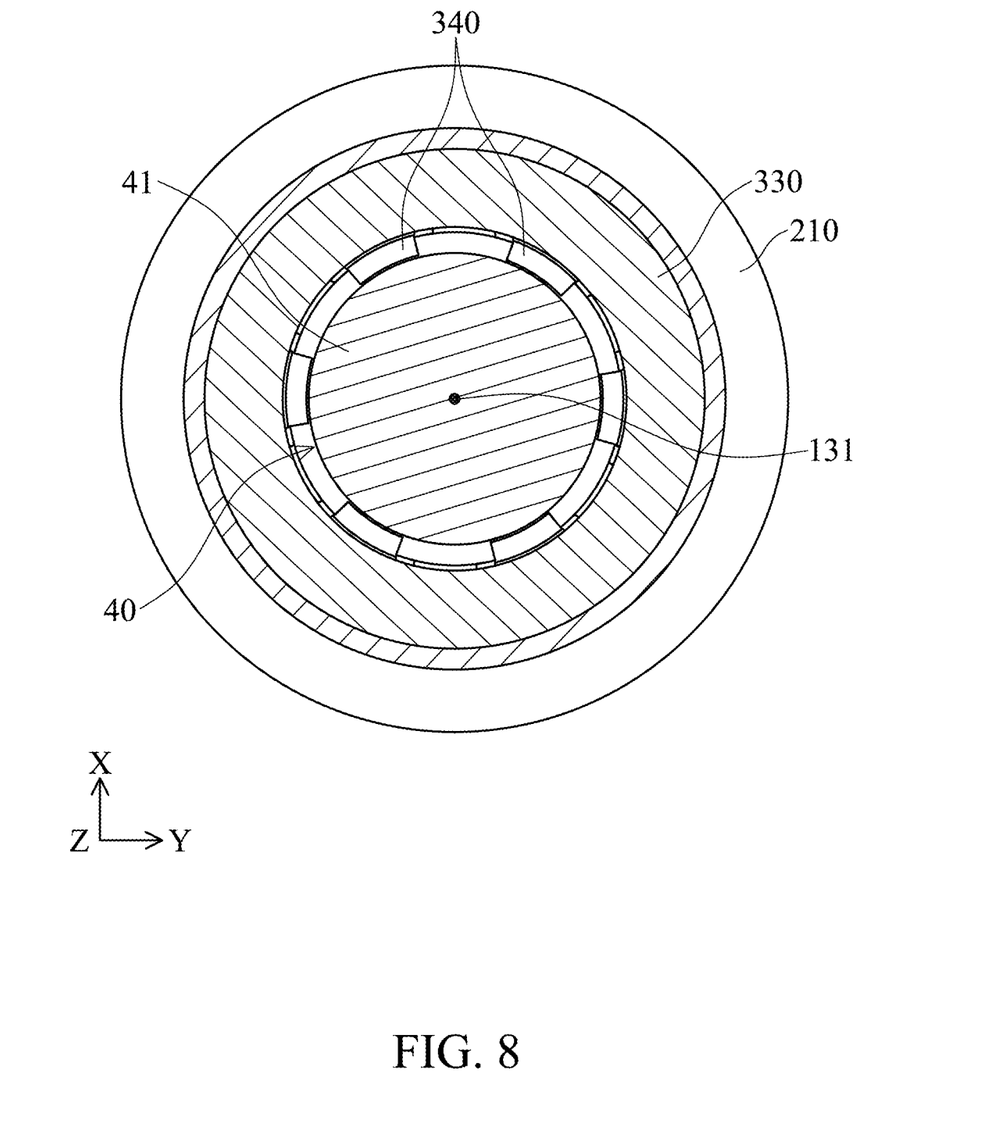
FIG. 8 is a cross-sectional view of the vacuum clamping nozzle according to an embodiment of the invention.

Referring to FIG. 8, in this embodiment, the clamping assembly 300 includes a plurality of contact members 340. These contact members 340 are arranged in a rotational symmetric manner relative to the central axis 131 of the channel 130.

In summary, a vacuum clamping nozzle is provided. The vacuum clamping nozzle is connected to a vacuum generator and configured to apply suction to a locking member. The vacuum clamping nozzle includes a first housing, a second housing, an accommodating space, a gap, and a clamping assembly. The first housing includes a first lateral wall, a first lower surface, a channel, a through hole, and a first opening. The first lateral wall is connected to the first lower surface, and surrounds the channel. The through hole and the first opening are respectively formed on the first lateral wall and the first lower surface, and are communicated with each other. The second housing is fixedly connected to the first housing, and includes a second lateral wall, a second lower surface, and a second opening. The second lateral wall is connected to the second lower surface, and surrounds the first lateral wall. The second opening is formed on the second lower surface, and corresponds to the first opening. The accommodating space is formed between the first lateral wall and the second lateral wall, and the through hole is communicated with the channel and the accommodating space. The gap is formed between the first lower surface and the second lower surface, and communicated with the first opening and the second opening. The accommodating space is communicated with the gap. The clamping assembly is disposed in the accommodating space. When the vacuum generator exhausts the gas in the channel, and the locking member covers the first opening, the clamping assembly moves relative to the first housing, and is in contact with the locking member via the gap.

A vacuum clamping nozzle is also provided. The vacuum clamping nozzle is connected to a vacuum generator and configured to apply suction to a locking member. The vacuum clamping nozzle includes a first housing, a second housing, an accommodating space, a movable member, and a contact member. The first housing includes a first lateral wall, a channel, a through hole, and a first opening. The first lateral wall surrounds the channel. The through hole is formed on the first lateral wall, and the first opening is communicated with the channel. The second housing is fixedly connected to the first housing, and includes a second lateral wall, a second lower surface, and a second opening. The second lateral wall surrounds the first lateral wall, and the second opening corresponds to the first opening. The accommodating space is formed between the first lateral wall and the second lateral wall. The through hole is communicated with the channel and the accommodating space. The movable member is disposed in the accommodating space, and the contact member is connected to the first housing. When the vacuum generator exhausts the gas in the channel, and the locking member covers the first opening, the movable member moves relative to the first housing and pushes the contact member, and the contact member is in contact with the locking member.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A vacuum clamping nozzle, connected to a vacuum generator and configured to apply suction to a locking member, wherein the vacuum clamping nozzle comprises:
    a first housing, comprising:
        a first lateral wall;
        a first lower surface, connected to the first lateral wall;
        a channel, wherein the first lateral wall surrounds the channel;
        a through hole, formed on the first lateral wall and passing through the first lateral wall; and
        a first opening, formed on the first lower surface, wherein the first opening is opened onto the channel;
    a second housing, fixedly connected to the first housing, and comprising:
        a second lateral wall, surrounding the first lateral wall;
        a second lower surface, connected to the second lateral wall; and
        a second opening, formed on the second lower surface and corresponding to the first opening;
    an accommodating space, formed between the first lateral wall and the second lateral wall, wherein the through hole is opened onto the channel and the accommodating space;
    a gap, formed between the first lower surface and the second lower surface, wherein the gap is opened onto the first opening and the second opening, and the accommodating space is opened onto the gap; and
    a clamping assembly, disposed in the accommodating space, wherein when the vacuum generator exhausts the gas in the channel and the locking member covers the first opening, the clamping assembly moves relative to the first housing and is in contact with the locking member.

2. The vacuum clamping nozzle as claimed in claim 1, wherein the clamping assembly comprises a rotatable member, and the rotatable member is pivotally connected to the first housing or the second housing.

3. The vacuum clamping nozzle as claimed in claim 2, wherein the rotatable member is movable relative to the first housing.

4. The vacuum clamping nozzle as claimed in claim 2, wherein the rotatable member comprises a pivot portion and a clamping portion, and the pivot portion is rotatably connected to the first housing or the second housing.

5. The vacuum clamping nozzle as claimed in claim 4, wherein when the vacuum generator exhausts the gas in the channel, and the locking member covers the first opening, the clamping portion is in contact with the locking member.

6. The vacuum clamping nozzle as claimed in claim 2, wherein when the clamping assembly is in a predetermined position, the clamping assembly is spaced away from the through hole by a distance, wherein when the vacuum generator exhausts the gas in the channel, and the locking member covers the first opening, the clamping assembly seals the through hole.

7. The vacuum clamping nozzle as claimed in claim 6, wherein the clamping assembly further comprises a sealing member disposed on the rotatable member, and the sealing member can seal the through hole.

8. The vacuum clamping nozzle as claimed in claim 7, wherein the sealing member comprises soft material or metal material.

9. A vacuum clamping nozzle, connected to a vacuum generator and configured to apply suction to a locking member, wherein the vacuum clamping nozzle comprises:
    a first housing, comprising:
        a first lateral wall;
        a channel wherein the first lateral wall surrounds the channel;
        a through hole, formed on the first lateral wall; and
        a first opening, opened onto the channel;
    a second housing, fixedly connected to the first housing, and comprising:
        a second lateral wall, surrounding the first lateral wall; and
        a second opening, corresponding to the first opening;
    an accommodating space, formed between the first lateral wall and the second lateral wall, wherein the through hole is opened onto the channel and the accommodating space;
    a movable member, disposed in the accommodating space; and
    a contact member, connected to the first housing, wherein when the vacuum generator exhausts the gas in the channel, and the locking member covers the first opening, the movable member moves relative to the first housing and pushes the contact member, and the contact member is in contact with the locking member.

10. The vacuum clamping nozzle as claimed in claim 9, wherein when the movable member pushes the contact member, the contact member is deformed.

11. The vacuum clamping nozzle as claimed in claim 9, wherein the movable member has an inclined surface facing the contact member.

12. The vacuum clamping nozzle as claimed in claim 11, wherein the contact member has an additional inclined surface facing the inclined surface, and the slope of the additional inclined surface is substantially the same as the slope of the inclined surface.

13. The vacuum clamping nozzle as claimed in claim 9, wherein the contact member comprises a protruding portion, wherein when the vacuum generator exhausts the gas in the channel, and the locking member covers the first opening, the protruding portion is in contact with the locking member.

14. The vacuum clamping nozzle as claimed in claim 9, wherein the contact member comprises metal material, and the movable member comprises metal material.

15. The vacuum clamping nozzle as claimed in claim 9, wherein the contact member and the first housing are integrally formed in one piece.

* * * * *